Sept. 22, 1970     R. G. SCHAEFER     3,529,799
LOCKING HANGER ASSEMBLY
Filed Oct. 30, 1968
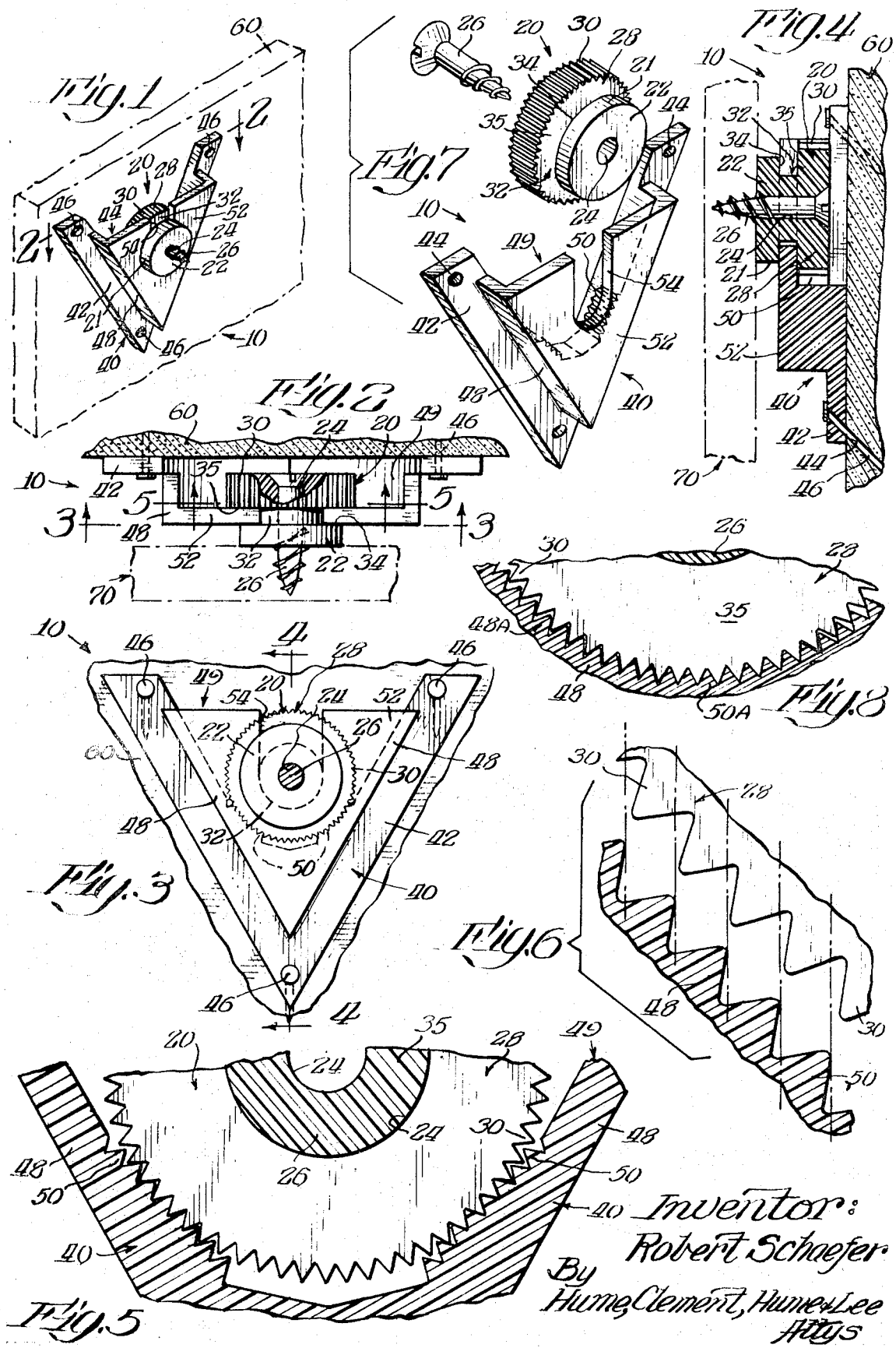

United States Patent Office 3,529,799
Patented Sept. 22, 1970

3,529,799
LOCKING HANGER ASSEMBLY
Robert G. Schaefer, 2544 Golf Road,
Glenview, Ill. 60025
Filed Oct. 30, 1968, Ser. No. 771,812
Int. Cl. A47g 1/16
U.S. Cl. 248—496     6 Claims

ABSTRACT OF THE DISCLOSURE

An assembly for hanging objects such as pictures and the like in a predetermined fixed position on a wall or other supporting surface comprising the combination of hanger means adapted to be secured to the object and having a rearwardly extending locking head provided with gripping means about its periphery; abutment means on the hanger means adjacent the forward end of the head; supporting means adapted for attachment to the supporting surface and having a forward portion provided with a pair of transversely spaced and downwardly extending locking members including interior surfaces defining a channel adapted to receive said locking head; gripping means provided on opposed portions of said interior surfaces of the spaced locking means and adapted for locking engagement with said gripping means on said locking head to create a jam-tight fit between said head and locking means and prevent rotation of said head within said channel; and stop means engageable with said abutment means to prevent substantial forward and downward movement of the hanger means with respect to the supporting means when said gripping means are in locking engagement.

BACKGROUND AND SUMMARY OF THE INVENTION

This invention relates generally to a hanger assembly for mounting and releasably locking objects such as pictures and the like in a predetermined and fixed position on a wall or other supporting surface.

As well-known by those skilled in the art, a persistent problem has existed with respect to designing an improved device for hanging objects, such as pictures and the like, on walls or other supporting structures. Many of the prior hanging devices, while operating sufficiently as supporting means, do not adequately lock the object in a fixed position. Thus, with prior devices it often is necessary to adjust the object to return it to the desired position on the wall after it has been moved out of adjustment by forces such as sound or wind vibrations or by the impact of slamming doors and the like. A need therefore exists for an improved hanging device which will not only provide sufficient support for an object such as a picture, but also will releasably lock the object to the supporting surface in a manner which prevents rotational and translational movement of the object after it is mounted in the desired position.

Another problem in the art has been to design an improved hanging device which will satisfy the foregoing requirements of locking the objects in a fixed position on the supporting surface and will also permit the device to be selectively positioned in a plurality of predetermined locations on the surface. It has been found that such a combination of features is very advantageous, in that it allows an object such as a picture to be finely adjusted into a given position, such as a level position. Such combinations of features also permit the hanging device to lock the object in the finely adjusted position after the position of the object has been selected.

A corollary problem in this field relates to the design of a suitable hanger device for releasably locking an object in the desired position which is capable of being made on a mass-production basis. In order to compete with the simple forms of fasteners, such as screws and nails, the locking hanger must have an improved design which allows the device to be made from inexpensive materials, with inexpensive manufacturing techniques, so as to minimize the unit cost.

Accordingly, to solve the above-mentioned problems, this invention provides a locking hanger assembly which will operate to maintain an object in a predetermined and fixed position on a supporting surface by means of components which co-operate to positively prevent the movement of the object in either a downward, forward or rotational direction after the object has been placed in its desired position. This invention also provides an assembly which allows an object such as a picture to be finely adjusted on a supporting surface, such as into a level position thereon, and then releasably locked in its desired position. Furthermore, the invention provides a locking hanger assembly design which allows the assembly to be manufactured from inexpensive bulk materials, such as plastics and the like, by employing economical manufacturing techniques, such as conventional plastic molding methods.

Briefly summarized, the locking hanger assembly incorporating the features of the present invention includes a hanger means adapted for attachment to the object to be hung, and a supporting means adapted for attachment to the supporting surface and designed to releasably lock the hanger means in a predetermined position on the supporting surface. The rearward portion of the hanger means defines a locking head having a substantial peripheral extent which is provided with a set of peripheral gripping means, such as gear teeth or the like. The hanger means also includes an abutment adjacent the head. The supporting means has a forward portion provided with a pair of spaced locking members having interior surfaces defining a downwardly extending channel which is dimensioned so as to receive the locking head of the hanger means. Further, a second set of frictional gripping means, such as gear teeth and the like, is provided on a portion of the interior surfaces of the locking members and is adapted for positive locking engagement with the gripping means on the locking head.

In addition, the firctional gripping means on the locking head and the locking members are adapted for locking engagement in a plurality of positions, so that the relative positioning of the hanger means and the supporting means can be selectively adjusted. With this arrangement, the gripping means on the head and the locking members allow the hanger means to be adjusted in a plurality of different rotational positions within the channel defined between the locking members, and then releasably locked in the selected position. In the preferred embodiment of the present invention, the locking members converge downwardly so that the foregoing engagement between the gripping means is assured by a jam-tight fit of the locking head between the converging locking members.

Furthermore, the supporting means includes a stop member adapted for engagement with the abutment on the hanger means to prevent any substantial forward or downward movement of the hanger means with respect to the supporting means when the sets of gripping means are in locking engagement. Accordingly, the locking hanger assembly embodying the features of the present invention will maintain an object in a predetermined and fixed position on the supporting surface by positively preventing any rotational, forward or downward movement of the object. However, the arrangement of the components of the assembly permits the hanger means to be readily disengaged from the supporting means simply by moving the locking head upwardly within the channel defined between the locking members. The assembly in accordance with this invention thereby allows the object to be removed easily from the supporting surface, or to be easily adjusted into a different predetermined position.

EXEMPLARY EMBODIMENT

Additional objects and features of the present invention will be more fully understood by considering the following description of exemplary embodiments of the invention, taken in conjunction with the drawing, in which:

FIG. 1 is a perspective view showing a locking hanger assembly incorporating the features of the present invention in position on a supporting surface;

FIG. 2 is a plan view of the locking hanger assembly as viewed along the line 2—2 in FIG. 1;

FIG. 3 is a cross-sectional front elevational view of the locking hanger assembly, taken along the line 3—3 in FIG. 2;

FIG. 4 is a cross-sectional side elevational view of the assembly taken along the line 4—4 in FIG. 3;

FIG. 5 is an enlarged fragmentary cross-sectional view of the locking hanger assembly taken along the line 5—5 in FIG. 2, illustrating the engagement of the frictional gripping means provided on the assembly;

FIG. 6 is an enlarged fragmentary cross-sectional view of the frictional gripping means illustrated in FIG. 5, showing the manner in which the gripping means can move into engagement;

FIG. 7 is an exploded perspective view of the locking hanger assembly illustrated in FIGS. 1–6; and FIG. 8 is an enlarged fragmentary cross-sectional view of a modified form of frictional gripping means which may be incorporated in the locking hanger assembly embodying the features of the present invention.

Referring initially to FIG. 1 of the accompanying drawing, the locking hanger assembly 10 embodying the features of the present invention is illustrated as being mounted in a predetermined position on a supporting wall structure 60. As seen in FIGS. 1, 4 and 7, the assembly 10 generally comprises a hanger portion 20 and a supporting portion 40 which cooperate to maintain objects, such as a picture 70 or the like, in a predetermined fixed position on the wall 60 or other supporting structure. The supporting portion 40 is adapted for attachment to the front face of the wall 60, and the hanger portion 20 is adapted for attachment to the back of the picture 70 to be hung on the wall 60. In a preferred embodiment of the invention, the components 20 and 40 of the locking hanger assembly 10 are made from an inexpensive plastic material by conventional plastic molding techniques.

Referring to the drawing in more detail, the hanger 20 is preferably generally cylindrical in shape and has a forward portion 21 provided with a generally flat forward face 22. The flat face 22 thus permits the hanger 20 to abut against the back surface of the picture 70, as clearly illustrated in FIGS. 2 and 4. The hanger 20 also is provided with suitable fastening means for securing the hanger to the picture 70 with the flat forward face 22 of the hanger in abutting relationship with the back of the picture. In the illustrated embodiment, the hanger 20 is provided with an axial bore 24 and the fastening means comprises a screw 26 which projects through the bore 24 into the back of the picture 70. Of course, it will be appreciated by those skilled in the art that other suitable fastening means, such as nails or cement or the like, can be employed with equal facility to join the hanger 20 to the object to be hung, such as the picture 70, without departing from the scope of this invention.

The hanger 20 also includes a rearward portion which defines a locking head 28 having a substantial peripheral surface area. As clearly illustrated in FIG. 7, the locking head 28 is preferably cylindrical in configuration so as to provide a wide peripheral surface extending axially along the hanger 20. In accordance with this invention, the periphery of the locking head 28 includes frictional gripping means which are designed to prevent rotation of the hanger 20 when the assembly 10 is in use. The frictional gripping means on the head 28 comprises a set of continuous gear teeth 30 in the preferred embodiment of this invention.

As clearly illustrated in FIGS. 3 and 7 of the drawings, these gear teeth 30 are uniformly spaced about the periphery of the head 28, and are provided with a small pitch diameter so that the maximum number of teeth can be spaced on the periphery of the head. For instance, in the illustrated embodiment, the locking head 28 is provided with 60 gear teeth 30, spaced 6° apart. The resulting small size of the gear teeth 30 allow the position of the head 28 to be finely adjusted into a plurality of rotational positions with respect to the support 40, as explained further hereinafter. Moreover, in the preferred arrangement, the teeth 30 have rounded outer edges, as shown in FIG. 6, and are cut into the head 28 in an axial direction. The teeth 30 also extend along the full width of the head 28, so as to provide the head 28 with gripping means having substantial contact areas for engaging with a mating gripping means provided on the support 40.

The hanger 20 in accordance with this invention further includes abutment means designed to prevent translational downward or forward movement of the hanger and the associated picture 70 after the components of the assembly 10 have been adjusted to mount the picture 70 in the desired position on the wall 60. To provide this abutment means, the hanger 20 includes a circular groove 32, of a predetermined width, which is positioned on the hanger 20 between the front hanger portion 21 and the locking head 28. As seen in FIGS. 2 and 4, the groove 32 thereby defines an annular front shoulder 34 on the front portion 21 of the hanger 20, and an annular rear shoulder 35 on the locking head 28. As described further below, the abutment means defined by the shoulders 34 and 35 cooperate with the support means 40 to prevent the translational movement of the hanger 20 and the picture 70 from a fixed position.

As seen in FIGS. 1 and 7, the support means 40 incorporated in the hanger assembly 10 preferably is generally U-shaped in configuration so as to minimize the amount of materials needed for its construction. This support 40 includes a rear mounting plate 42 adapted for engaging the face of the supporting wall 60, to mount the support 40 on the wall. In the illustrated embodiment, the plate 42 is a U or V shaped flange, and is provided with spaced apertures 44 for receiving fasteners, such as the nails 46, to attach the plate to the wall 60. As indicated in FIG. 4, the apertures 44 are preferably inclined downwardly in the plate 42 so that nails 46 extend downwardly into the face of the wall 60. This arrangement will provide additional resistance to the downward loading forces which are applied to the support 40 when the assembly 10 is in use. The plate 42 also creates a substantial area of contact between the support 40 and the wall 60, and thereby increases the resistance of the support 40 to the downward loading forces.

The support 40 in accordance with the present invention further includes a forward portion adapted to receive the hanger 20 and to releasably lock the hanger in a plurality of predetermined positions with respect to the wall 60. In this regard, the forward portion of the support 40 includes a pair of locking members 48 which are spaced transversely on the support 40 to define a downwardly extending channel 49 therebetween. The tranverse width and the depth of the channel 49 are selected so that the channel can readily receive the locking head 28 of the hanger 20. In the preferred arrangement, the members 48 are formed integrally with the mounting plate 42, and converge downwardly so that the locking head 28 can be engaged between the members 48 in a jam-tight fit by moving the head downwardly in the channel 49.

In addition, in accordance with this invention, opposed portions of the locking members 48 are provided with frictional gripping means adapted to cooperate with the gripping means on the periphery of the hanger head 28 to lock the hanger 20 and prevent its rotation with respect to the support 40. In the preferred arrangement, as clearly illustrated in FIGS. 3 and 5, such gripping means comprises a rack of gear teeth 50 provided on opposed interior surfaces of the locking members 48. As seen in FIG. 5, the gear teeth 50 have substantially the same pitch diameter and configuration as the teeth 30 on the locking head 28, and are arranged on the lower portion of each member 48 so that they can readily engage with the disengage from the teeth 50 on the locking head. In the embodiment illustrated in FIGS. 1–7, the engagement between the sets of teeth 50 and 30 is facilitated by positioning each rack of teeth 50 at a predetermined angled on the associated locking member 48. It has been found that the proper engagement of the gear teeth could be further assured by inclining the gear teeth 50 upwardly on the members 48, if such a tooth design is desirable for particular applications.

The preferred angular inclination for the gear teeth 50 on the members 48, as illustrated in FIGS. 3 and 5 of the drawings, creates a force component which causes the gears 30 and 50 to jam together and lock in engagement as a result of the downward pull on the hanger 20 created by the weight of the picture 70. However, it will be appreciated by those skilled in the art that suitable modified gripping arrangements, such as the modification illustrated in FIG. 8, could be devised without departing from the present invention.

In the modification of the invention shown in FIG. 8, the lower portion of the locking members are joined to define a circular recess 48A. Further, the gear teeth 50A are positioned within the recess 48A, and are dimensioned to have substantially the same pitch diameter as the teeth 30 on the locking head 28. Accordingly, in the modification illustrated in FIG. 8, the head 28 can be received within the recess 48A, and the gear teeth 30 and 50A will thereby engage throughout a substantial sector of the locking head 28. As described above, the weight of the picture 70, transmitted through the hanger 20, will maintain the gears 30 and 50A in locking engagement.

The support 40 in accordance with this invention further includes stop means engageable with the above-described abutment means on the hanger 20 to prevent substantial forward or downward movement of the hanger 20. In this regard, the support 40 includes a front plate 52 which extends transversely across the front of the locking members 48. As shown in FIGS. 1, 3 and 7, the front plate 52 is preferably formed integrally with the locking members 48, and incorporates stop means for engaging with the hanger 20.

To provide the stop means, the central portion of the plate 52 is cut away to form an elongate vertical slot 54, and such slot is dimensioned to receive hanger 20 within the groove 32 formed in the central portion of the hanger. In addition, the vertical depth of the slot 54 is selected so that the front plate 54 will not interfere with the engagement between the gear teeth 30 and 50, as described above. By this arrangement, the hanger 20 can be forced downwardly between the locking members 48 with the plate 52 received within the groove 32. The edges of plate 52 along the slot 54 will then engage with the annular shoulders 34 and 35 on the locking head 28. The front plate 52 thereby acts as stop means, and prevents the hanger 20 from moving forward or downward with respect to the support 40.

In the operation of the locking hanger assembly 10, the support 40 is attached to the front of the wall 60, in the desired location, with the slot 54 extending vertically downward. Then, the hanger 20 is secured to the back surface of the picture 70 at approximately the center of the picture. The picture 70 can then be mounted on the wall 60 by engaging the front plate 52 of the support 40 within the groove 32 on the hanger 20, and forcing the hanger 20 downwardly with respect to the support 40. This motion also positions the locking head 28 on the hanger 20 within the channel 49. The downward movement of the hanger 20 is continued until the gear teeth 30 on the locking head 28 engage with the gear teeth 50 on the locking members 48. If the modification shown in FIG. 8 is employed, the downward motion of the hanger 20 is continued until the gear teeth 30 engage with the gear teeth 50A.

With the components of the assembly 10 arranged in the foregoing manner, the hanger 20 and the associated picture 70 are locked in a fixed predetermined position on the wall 60, since the engaged gear teeth 30 and 50 (or 50A) prevent any rotational movement and the engaged plate 52 and shoulders 34 and 35 prevent any substantial downward or forward movement. Moreover, due to the small pitch of the gear teeth 30 and 50 (or 50A), the hanger 20 and picture 70 can be adjusted to any one of a plurality of fixed positions, merely by raising the hanger 20 and rotating it so that the gear teeth 30 are advanced one or more teeth with respect to the gear teeth 50 (or 50A). The hanger 20 and the picture 70 will be locked into this new position when the hanger is again lowered to bring the gear teeth into engagement. Finally, it is evident that the picture 70 can be easily removed from the wall 60 by merely raising the picture to disengage the hanger 20 from the support 40.

Although the present invention has been described above with a certain degree of particularity with respect to hanging pictures on wall surfaces, it should be understood that the present disclosure has been made only by way of example. Consequently, numerous changes in the details of construction and the combination and arrangement of components, as well as the possible modes of utilization, will be apparent to those skilled in the art and may be resorted to without departing from the spirit and scope of the invention as claimed.

What is claimed is:
1. An assembly for hanging objects such as pictures and the like on a supporting surface comprising in combination:
  hanger means having a forward portion provided with means for securing said hanger to the object to be hung and further having a rearward portion defining a head having a substantial periphery;
  first frictional gripping means provided around said periphery of said hanger head;
  abutment means provided on said hanger means adjacent said head;
  supporting means having a rearward portion adapted for attachment to said supporting surface and further having a forward portion provided with a pair of transversely spaced locking members including interior surfaces which define a downwardly extending channel adapted to receive said hanger head;
  second gripping means provided on said interior surfaces of said locking members and adapted for locking engagement with said first gripping means when said hanger head is within said channel to prevent said head from rotating within said channel; and
  stop means provided on said supporting means and engageable with said abutment means to prevent substantial forward and downward movement of said hanger means with respect to said supporting means when said first and second gripping means are in locking engagement;
  whereby said hanger means and supporting means cooperate to maintain an object in a predetermined fixed position on said supporting surface.

2. An assembly in accordance with claim 1 wherein said locking members converge downwardly and create a jam-tight fit between said first and second gripping means as said hanger head is forced downwardly within said channel.

3. An assembly in accordance with claim 1 wherein said first and second frictional gripping means comprise mating gear teeth that are engageable to positively prevent rotation of said hanger head within said channel.

4. An assembly in accordance with claim 3 wherein said hanger head has a circular periphery surrounded with gear teeth and wherein said locking members converge downwardly to define a circular recess provided with mating gear teeth adapted to forcefully engage with the gear teeth on a sector of said circular head.

5. An assembly for hanging objects such as pictures and the like on a supporting surface comprising, in combination:
- a hanger means having a forward portion provided with means for securing said hanger to the object to be hung and further including a rearward portion defining a generally cylindrical locking head having a substantial periphery;
- a first set of gear teeth provided around the periphery of said locking head;
- circular abutment means provided on said hanger means adjacent the forward end of said cylindrical head;
- supporting means having a rearward portion adapted for attachment to said supporting surface and further having a forward portion provided with a pair of transversely spaced and downwardly converging locking members including interior surfaces which define a downwardly extending channel adapted to receive said cylindrical hanger head;
- a second set of gear teeth provided on opposed portions of said converging interior surfaces of said spaced locking members and adapted for locking engagement with said first set of gear teeth on said locking head to create a jam-tight fit of said head between said locking members to prevent rotation of said head within said channel; and
- a stop means provided on the forward portion of said supporting means between said converging locking members and engageable with said circular abutment means to prevent substantial forward and downward movement of said hanger means with respect to said supporting means said first and second sets of gear teeth are in locking engagement,
- whereby said hanger means and supporting means cooperate to maintain an object in a predetermined fixed position on said supporting surface.

6. An assembly in accordance with claim 5 wherein said circular abutment means is defined by a grooved recess surrounding said hanger means adjacent the forward end of said head and wherein said stop means comprises a stop member extended between the forward ends of said locking members, said stop member including an elongate slot for receiving said grooved recess of said hanger means so that said stop member engages with said hanger means within said recess when said first and second sets of gear teeth are in locking engagement.

References Cited
UNITED STATES PATENTS

| 999,961 | 8/1911 | Colas | 248—496 X |
| 2,889,128 | 6/1959 | Martin et al. | 248—324 |

FOREIGN PATENTS

| 922,987 | 2/1947 | France. |
| 363,385 | 11/1922 | Germany. |

ROY D. FRAZIER, Primary Examiner

F. DOMOTOR, Assistant Examiner